(12) United States Patent
Tomioka

(10) Patent No.: US 7,180,681 B2
(45) Date of Patent: Feb. 20, 2007

(54) VARIFOCAL LENS WITH INDEPENDENT IMAGE PLANE POSITION ADJUSTMENT

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 118 days.

(21) Appl. No.: 11/152,062

(22) Filed: Jun. 15, 2005

(65) Prior Publication Data
US 2005/0280901 A1    Dec. 22, 2005

(30) Foreign Application Priority Data
Jun. 17, 2004   (JP)   .............................. 2004-179439

(51) Int. Cl.
*G02B 15/14* (2006.01)
(52) U.S. Cl. .................. 359/687; 359/685; 359/686
(58) Field of Classification Search ................ 359/684, 359/685, 686, 687
See application file for complete search history.

(56) References Cited

U.S. PATENT DOCUMENTS 5,790,316 A * 8/1998 Terasawa et al. ........... 359/687

FOREIGN PATENT DOCUMENTS

| JP | 7-113942 | 5/1995 |
|---|---|---|
| JP | 2001-194590 | 7/2001 |
| JP | 2003-121737 | 4/2003 |

\* cited by examiner

*Primary Examiner*—David N. Spector
(74) *Attorney, Agent, or Firm*—Arnold International; Jon W. Henry; Bruce Y. Arnold

(57) ABSTRACT

A varifocal lens that corrects aberrations in the visible and near-infrared regions includes, in order from the object side, a first lens group of positive refractive power, a second lens group of negative refractive power, and third and fourth lens groups, each of positive refractive power. The second lens group moves along the optical axis to vary the focal length, and the fourth lens group is independently movable to compensate for movement of the image plane due to movement of the second lens group during varifocal adjustment. Aspheric lens surfaces are disclosed. Certain conditions are satisfied that relate to Abbe number and index of refraction of different lens elements, the distance between the first and third lens groups, the chromatic aberration and focal length of the first lens group, and the movement of the second lens group and the focal length change associated with this movement.

18 Claims, 6 Drawing Sheets

VARIFOCAL LENS WITH INDEPENDENT IMAGE PLANE POSITION ADJUSTMENT

FIELD OF THE INVENTION

The present invention relates to a varifocal lens that can be used in video cameras, broadcasting TV cameras, and similar devices, and especially relates to a varifocal lens for both day and night use that can image light from the visible light region to the near-infrared light region with a large varifocal range of focal lengths.

BACKGROUND OF THE INVENTION

Conventionally, various kinds of variable power optical systems that can be used in video cameras, broadcasting TV cameras, and similar devices, have been proposed. In particular, such devices have been proposed that include imaging lenses that include, in order from the object side, lens groups having positive, negative, positive, and positive refractive power, with the lens group having negative refractive power, the second lens group from the object side, moving toward the image side in order to perform zooming from the wide-angle end to the telephoto end. Such devices with such imaging lenses are shown, for example, in Japanese Laid-Open Patent Applications 2001-194590 and 2003-121737.

A varifocal lens is also known in a variable power optical system that does not use an interlocking mechanism in order to coordinate angle of view adjustment and focusing. Rather, the angle of view is adjusted by moving the variable power lens in the direction of the optical axis by rotating a varifocal ring installed on the lens barrel, and focusing error caused by the angle of view adjustment is corrected by moving a focusing lens in the optical axis direction by rotating a focus ring installed on the lens barrel, as shown, for example, in Japanese Laid-Open Patent Application H07-113942.

Recently, the demand for monitoring cameras for monitoring various kinds of facilities and roads has been increasing, especially the demand for the development of a variable power optical system that can be operated both day and night and that has a large range of variable focal lengths.

Because many conventional variable power optical systems vary the focal length by moving the second lens group from the object side along the optical axis toward the image side and correct the movement of the focal plane by moving the fourth lens group from the object side in an interlocked and coordinated manner with the second lens group, a mechanism to interlock the second lens group with the fourth lens group has become necessary. Such a mechanism is complex and prevents making the optical system as small as desired.

Simplifying the mechanism for moving the two lens groups by not using an interlocking mechanism between the second lens group and the fourth lens group in a variable power optical system may be considered, thus allowing the mechanism and the lens barrel generally to be made smaller. However, conventional variable power optical systems and varifocal lenses are not generally designed for use both during the day and at night, and, therefore, adequate correction of chromatic aberration in the range from the visible light region to the near-infrared light region is not made. Consequently, when the varifocal lens is focused in the visible light region, in order to use it in the near-infrared light region, focusing had to be performed again, complicating the operation. Also, in attempting to make the operation more versatile, expensive functions, such as autofocus functions, have had to be added.

BRIEF SUMMARY OF THE INVENTION

The present invention is a varifocal lens operated with a simple mechanism that allows the lens barrel to be small, that provides a wide range of focal lengths, and that can achieve high optical performance from the visible light region to the near-infrared light region.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
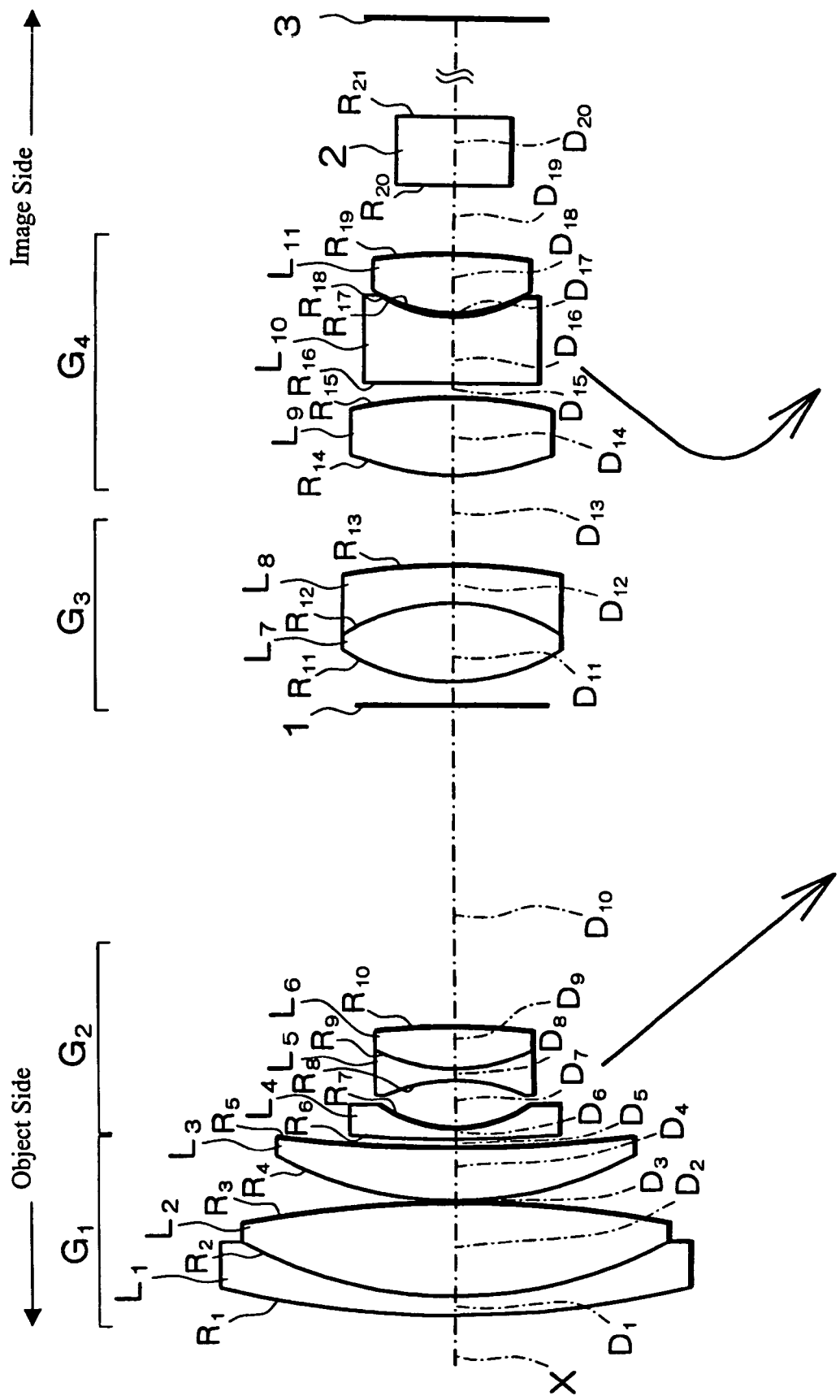
FIG. 1 shows a cross-sectional view of Embodiment 1 of the varifocal lens of the present invention at the wide-angle end.

A general description of the varifocal lens of the present invention that pertains to the two embodiments of the invention will first be described primarily with reference to FIG. 1 that shows Embodiment 1. In FIG. 1, a horizontal arrow at the upper left labeled "Object side" points in the direction indicating the object side of the varifocal lens and a horizontal arrow at the upper right labeled "Image side" points in the opposite direction indicating the image side of the varifocal lens. In FIG. 1, four lens groups are labeled $G_1$–$G_4$ in order from the object side of the varifocal lens and lens elements that belong to each lens group are indicated by brackets just below the labels $G_1$–$G_4$. Arrows below the labels $G_2$ and $G_4$ indicate the general direction of movement of these lens groups during varying of the focal length. Lens groups $G_1$ and $G_3$ remain stationary when the focal length is varied. The lens elements of the lens groups are referenced by the letter L followed by a number denoting their order from the object side of the varifocal lens along the optical axis X, from $L_1$ to $L_{11}$. Radii of curvature of the surfaces of the various optical elements, including the lens surfaces, are referenced by the letter R followed by a number denoting their order from the object side of the varifocal lens, from $R_1$ to $R_{21}$. The on-axis surface spacings along the optical axis X of the various optical surfaces are referenced by the letter D followed by a number denoting their order from the object side of the varifocal lens, from $D_1$ to $D_{20}$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the varifocal lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit.

As shown in FIG. 1, the varifocal lens of the present invention includes, arranged along an optical axis in order from the object side, a first lens group $G_1$ having positive refractive power, a second lens group $G_2$ having negative refractive power, a third lens group $G_3$ having positive refractive power, and a fourth lens $G_4$ having positive refractive power. Additionally, a stop 1 is placed between the second lens group $G_2$ and the third lens group $G_3$, and a filter unit 2, such as a UV cut-off filter, is placed on the image side of the fourth lens group $G_4$. A light flux incident from the object side along the optical axis X is focused at an image-forming position on an image plane 3 where an image detecting element, such as a charge-coupled device (CCD), may be located.

Varying the focal length from the wide-angle end to the telephoto end is performed by moving the second lens group $G_2$ along the optical axis while the first lens group $G_1$ and the third lens group $G_3$ remain stationary. Correction for movement of the image plane due to movement of the second lens group $G_2$ is made by independently moving the fourth lens group $G_4$ along the optical axis.

In adjusting the varifocal lens from the wide-angle end to the telephoto end, the second lens group $G_2$ moves from the object side toward the image side, and the fourth lens group $G_4$ moves toward the object side, reverses, and moves from the object side toward the image side.

As shown in FIG. 1, the first lens group $G_1$ includes, arranged in order from the object side, a first lens element $L_1$ of meniscus shape, having negative refractive power, and having a convex object-side lens surface, a second lens element $L_2$ of a biconvex shape, and a third lens element $L_3$ of meniscus shape, having positive refractive power, and having a convex object-side lens surface. Additionally, the first lens element $L_1$ and the second lens element $L_2$ are joined together to form a lens component.

The second lens group $G_2$ includes, arranged in order from the object side, a fourth lens element $L_4$ of meniscus shape, having negative refractive power, and having a convex object-side lens surface, a fifth lens element $L_5$ of biconcave shape, and a sixth lens element $L_6$ of biconvex shape. The fifth lens element $L_5$ and the sixth lens element $L_6$ are joined together to form a lens component.

The third lens group $G_3$ includes, arranged in order from the object side, a seventh lens element $L_7$ of biconvex shape and an eighth lens element $L_8$ of meniscus shape, having negative refractive power, and having a concave object-side lens surface. The seventh lens element $L_7$ and the eighth lens element $L_8$ are joined together to form a lens component.

Figure 2:
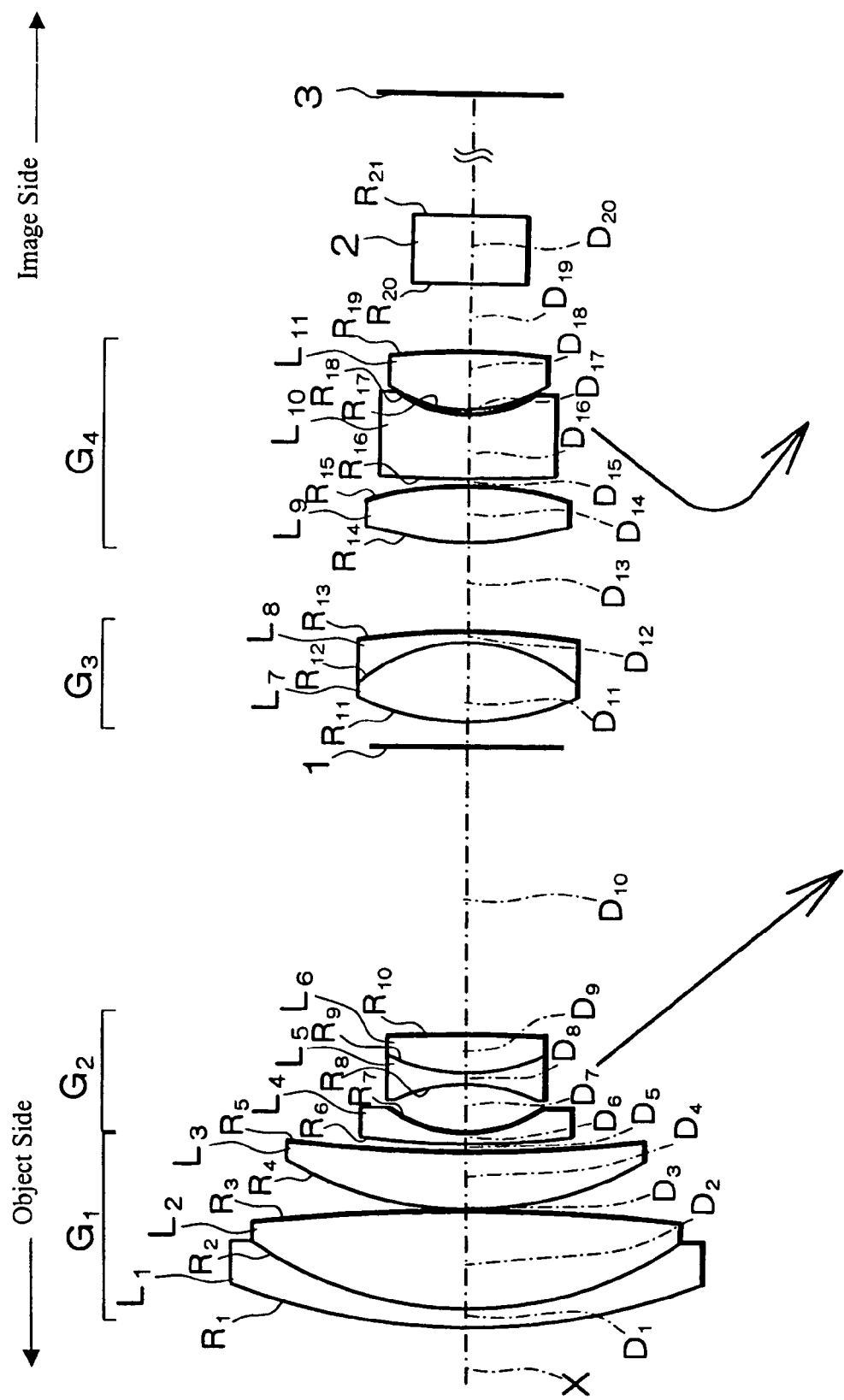
FIG. 2 shows a cross-sectional view of Embodiment 2 of the varifocal lens of the present invention at the wide-angle end.

As shown in FIG. 1, in Embodiment 1 of the present invention, the fourth lens group $G_4$ includes, arranged in order from the object side, a ninth lens element $L_9$ of biconvex shape, a tenth lens element $L_{10}$ of plano-concave shape, and an eleventh lens element $L_{11}$ of biconvex shape. However, as shown in FIG. 2, in Embodiment 2 of the present invention, the tenth lens element $L_{10}$ has a meniscus shape with its convex lens surface on the object side, but as in Embodiment 1, has negative refractive power.

By forming the lens groups as described above, miniaturization of the varifocal lens becomes possible while achieving a wide range of focal lengths and at the same time well correcting chromatic aberration from the visible light region to the near-infrared light region.

Additionally, in order to improve imaging, in Embodiment 1, as well as in Embodiment 2, of the present invention, both lens surfaces of the ninth lens element $L_9$ are aspheric surfaces. This is a specific implementation of the preference that at least one lens surface of the first lens element from the object side of the fourth lens group from the object side be an aspheric surface. This enables spherical aberration, which tends to become overcorrected in the periphery, to be corrected an appropriate amount. The aspheric surfaces are described by the following equation:

$$Z=[(C \cdot Y^2)/\{1+(1-K \cdot C^2 \cdot Y^2)^{1/2}\}]+\Sigma(A_i \cdot Y^i) \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is an aspheric coefficient, and the summation extends over i.

In embodiments of the invention disclosed below, only aspheric coefficients $A_3$–$A_{10}$ are non-zero.

The present invention is not limited to both lens surfaces of the ninth lens element $L_9$ being aspheric but advantageously at least one surface among the lens surfaces of the fourth lens group $G_4$ should be an aspheric surface. If the positive refractive power of the fourth lens group $G_4$ is increased, the amount of movement of the fourth lens group $G_4$ can be reduced, and the number of lens elements of the fourth lens group $G_4$ can be reduced by making at least one surface among the lens surfaces of the fourth lens group $G_4$ be an aspheric surface while increasing the positive refractive power of the fourth lens group $G_4$. Thus, providing an aspheric surface contributes to miniaturization of the varifocal lens.

Also, by having the aspheric equation contain odd-order terms, the degree of freedom of the aspheric form increases, which allows improved aberration correction. Especially by making the ninth lens element $L_9$ to include aspheric lens surfaces defined by an aspheric equation containing odd-order terms, correction for spherical aberration becomes even easier.

Although the descriptions of the lens elements above consecutively number all the lens elements of all the lens groups from the object side, the lens elements may also be described within each lens group as first, second, and so forth from the object side for each lens group, with the highest number of each lens group describing the lens element on the image side of a particular lens group.

Additionally, the varifocal lens of the present invention satisfies the following Conditions (1)–(5)

$\nu_{d12} > 75$      Condition (1)

$N_{d23} > 1.83$      Condition (2)

$0.9 < I_a/f_1 < 1.5$      Condition (3)

$1.2 < str/z < 2.5$      Condition (4)

$chro\_880/f_1 < 4.0 \times 10^{-3}$      Condition (5)

where $\nu_{d12}$ is the Abbe number of the second lens element of the first lens group at the d-line, $N_{d23}$ is the refractive index of the third lens element of the second lens group at the d-line, $I_a$ is the distance along the optical axis from the object-side lens surface of the object-side lens element of the first lens group of the varifocal lens to the object-side lens surface of the object-side lens element of the third lens group of the varifocal lens, $f_1$ is the composite focal length of the first lens group, str is the distance along the optical axis that the second lens group moves during varifocal adjustment of the varifocal lens, z is the ratio of the focal length of the varifocal lens at the telephoto end divided by the focal length of the varifocal lens at the wide-angle end, associated with movement of the second lens group over the distance str, and chro_880 is the chromatic aberration on the optical axis for a wavelength of 880 nm relative to the d-line for the first lens group.

The technical significance of Conditions (1)–(5) will now be explained. Condition (1) is a condition for correcting the on-axis chromatic aberration of the varifocal lens at the telephoto end by regulating the value of the Abbe number $\nu_{d12}$ of the lens element that is the second lens element from the object side of Embodiments 1 and 2. If Condition (1) is not satisfied, the on-axis chromatic aberration is not adequately corrected, making it impossible to guarantee good performance from the visible light region to the near-infrared light region.

Condition (2) is a condition for suppressing the curvature of field, especially the curvature of the sagittal image surface, by regulating the value of the refractive index $N_{d23}$ at the d-line of the lens element that is the third lens element from the object side of the second lens group from the object side of Embodiments 1 and 2. If Condition (2) is not satisfied, the curvature of field becomes large, making it impossible to guarantee good optical performance on the periphery of the image plane.

Condition (3) is a condition for miniaturizing the lens system and correcting the on-axis chromatic aberration at the telephoto end by regulating the ratio $I_a/f_1$, as defined above, which relate to the first lens group $G_1$ and the third lens group $G_3$ in Embodiments 1 and 2. If the upper limit of Condition (3) is not satisfied, the value of $I_a$ becomes large, making it impossible to miniaturize the varifocal lens. On the other hand, if the lower limit of Condition (3) is not satisfied, the refractive power of the first lens group $G_1$ becomes too strong to adequately correct the on-axis chromatic aberration at the telephoto end.

Condition (4) is a condition for miniaturizing the lens system and correcting the curvature of field by regulating the ratio str/z, as defined above. If the upper limit of Condition (4) is not satisfied, the amount of movement of the second lens group $G_2$ increases, making it impossible to miniaturize the varifocal lens. On the other hand, if the lower limit of Condition (4) is not satisfied, the refractive power of the second lens group $G_2$ becomes too strong to easily correct the curvature of field.

Condition (5) is a condition for well correcting the on-axis chromatic aberration by regulating the ratio $chro\_880/f_1$, as defined above. If Condition (5) is not satisfied, the on-axis chromatic aberration at the wavelength of 880 nm becomes large, degrading the optical performance in the near-infrared light region, especially at the telephoto end.

Figure 3:
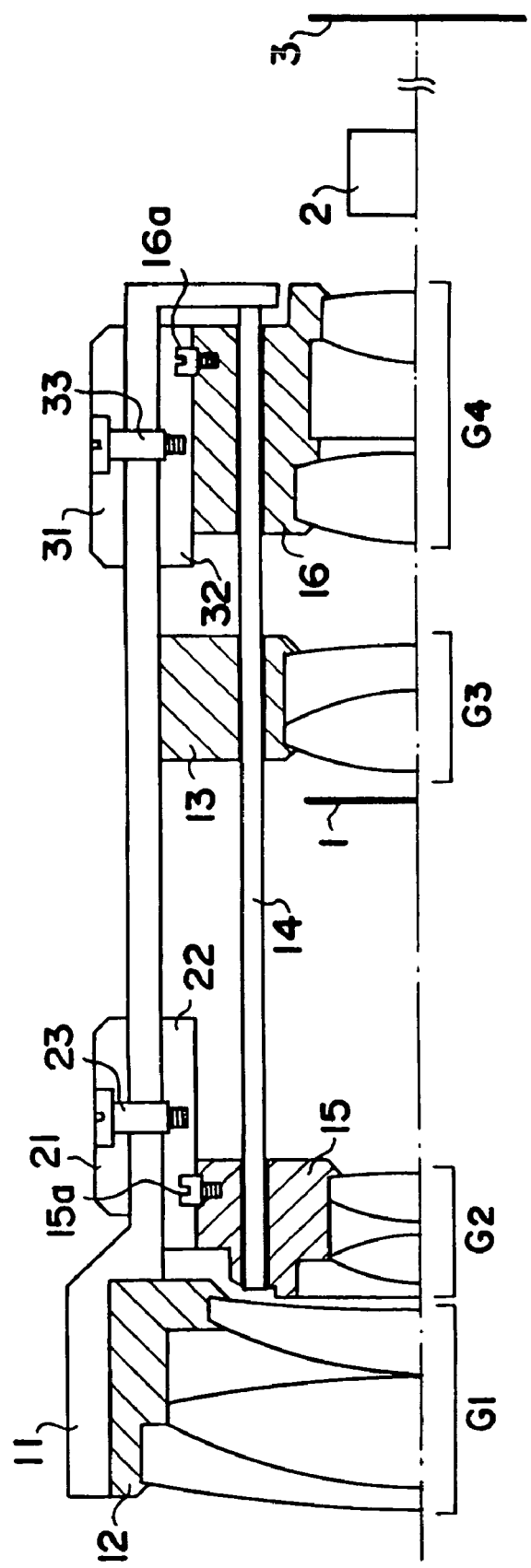
FIG. 3 shows an enlarged partial cross-sectional view of the varifocal lens of the present invention and the mechanisms for supporting the lens groups and moving the second and fourth lens groups.
Figure 4A:
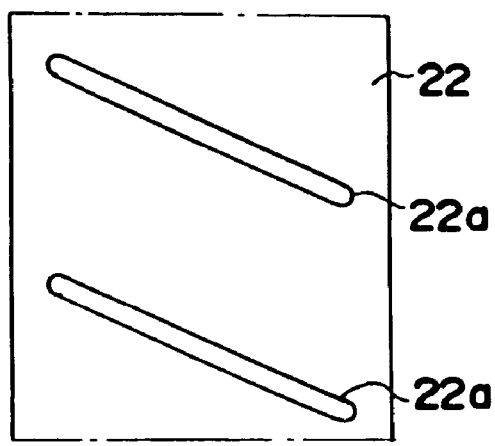
FIGS. 4A–4B show partial expanded views of a cam ring installed on the inner surface of the fixed barrel of the varifocal lens of FIG. 3.
Figure 4B:
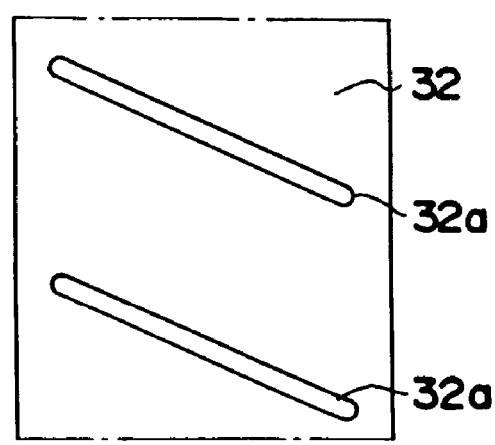

The mechanism for moving the second lens group $G_2$ and the fourth lens group $G_4$ of the varifocal lens of the present invention will now be explained with reference to FIG. 3 and FIGS. 4A and 4B. FIG. 3 shows an enlarged partial cross-sectional view of the varifocal lens of the present invention and the mechanisms for supporting the lens groups and moving the second lens group $G_2$ and the fourth lens group $G_4$. FIGS. 4A–4B show partial expanded views of a cam ring installed on the inner surface of the fixed barrel of the varifocal lens of FIG. 3.

As stated above, the varifocal lens of the present invention is constructed so that in varying the focal length from the wide-angle end to the telephoto end, the first lens group $G_1$ and the third lens group $G_3$ remain fixed along the optical axis, the second lens group $G_2$ moves along the optical axis toward the image side, and correction for the movement of the image plane along the optical axis due to movement of the second lens group $G_2$ along the optical axis is performed by independently moving the fourth lens group $G_4$ along the optical axis.

As shown in FIG. 3, installed on the inner surface of a fixed barrel 11 are a first lens group frame 12 for fixing and supporting the first lens group $G_1$ to the fixed barrel 11 and a third lens group frame 13 for fixing and supporting the third lens group $G_3$ to the fixed barrel 11.

Also, provided inside the fixed barrel 11 are a pair of straight-motion guide bars 14, only one of which is shown in FIG. 3, that are placed symmetrically about the optical axis and extend along the optical axis direction. Installed on these straight-motion guide bars 14 are a second lens group frame 15 that supports the second lens group $G_2$ for movement in the direction of the optical axis and a fourth lens group frame 16 that supports the fourth lens group $G_4$ for movement in the direction of the optical axis.

Also, on the outer surface of the fixed barrel 11 a second lens group operating ring 21 for moving the second lens group $G_2$ in the direction of the optical axis direction is rotatably attached. Similarly, on the outer surface of the fixed barrel 11 a fourth lens group operating ring 31 for moving the fourth lens group $G_4$ in the direction of the optical axis is also attached.

Additionally, a second lens group cam ring 22 is installed on the inner surface of the fixed barrel 11 at a position opposite the second lens group operating ring 21, and the second lens group operating ring 21 and the second lens group cam ring 22 are connected by a connecting pin 23 so that they rotate as one unit.

Referring to FIG. 4A, installed on the inner rim of the second lens group cam ring 22 are cam grooves 22a. The cam grooves 22a are installed in three lines every 120° about the optical axis so as to be inclined relative to the optical axis. Note that in FIG. 4A only two linear representations of the three cam grooves 22a are shown, which is also true of FIG. 4B as will be discussed below. Installed on the second lens group frame 15 are three cam pins 15a projecting from the outer rim at every 120°, designed so that the cam pins 15a slide in the cam grooves 22a of the second lens group cam ring 22.

When the second lens group operating ring 21 is rotated, the second lens group cam ring 22 is interlocked to rotate with it, and by the cam pins 15a sliding in the cam grooves 22a, the second lens group $G_2$ moves in the direction of the optical axis.

In the same way, installed on the inner surface of the fixed barrel 11 is a fourth lens group cam ring 32 at a position opposite the fourth lens group operating ring 31, and the fourth lens group operating ring 31 and the fourth lens group cam ring 32 are connected by a connecting pin 33 so that they rotate as one unit.

Installed on the inner rim of the fourth lens group cam ring 32 are cam grooves 32a (see FIG. 4B). The cam grooves 32a are installed in three lines every 120° about the optical axis so as to be inclined relative to the optical axis. Installed on the fourth lens group frame 16 are three cam pins 16a projecting from the outer rim at every 120°, designed so that the cam pins 16a slide in the cam grooves 32a of the fourth lens group cam ring 32.

When the fourth lens group operating ring 31 is rotated, the fourth lens group cam ring 32 is interlocked to rotate with it, and by the cam pins 16a sliding in the cam grooves 32a, the fourth lens group $G_4$ moves in the direction of the optical axis.

In this manner, the second lens group $G_2$ and the fourth lens group $G_4$ can be moved along the optical axis independently of each other. In the focal length and focusing adjustment, the second lens group operating ring 21 is rotated first to vary the focal length. Accompanying this, the image plane moves along the optical axis and a focus change occurs. The photographer focuses the varifocal lens by rotating the fourth lens group operating ring 31 while observing the images to be photographed.

In this way, because the varifocal lens of the present invention is constructed so that the second lens group $G_2$ and the fourth lens group $G_4$ move independently along the optical axis, there is no need to install an interlocking mechanism for the second lens group $G_2$ and the fourth lens group $G_4$. This makes possible simplifying the mechanism(s) for the varifocal and focusing adjustments and allows making the lens barrel smaller.

Although superficially the operation appears to be complex because the second lens group operating ring 21 and the fourth lens group operating ring 31 need to be operated separately, the varifocal lens of the present invention is particularly useful in monitoring cameras, and similar imaging devices, where frequent changes of the focal length are unnecessary, thus making a simpler mechanism and smaller size extremely advantageous although separate operations are required for varying the focal length and for focusing.

The varifocal lens of the present invention differs from the imaging lens of Japanese Laid-Open Patent Application 2001-194590. Like the present invention, the imaging lens of Japanese Laid-Open Patent Application 2001-194590 has a four-group construction of positive, negative, positive, and positive lens groups, in order from the object side, and the first and third lens groups from the object side are fixed during adjustment of the focal length and focusing adjustment associated with variation of the focal length. However, in Japanese Laid-Open Patent Application 2001-194590, the zooming operation is performed by moving the fourth lens group interlocked with the second lens group along the optical axis. In the varifocal lens of the present invention, effects unique to the varifocal lens of the present invention as explained above can be achieved based on the above described differences in construction, including movements of the second and fourth lens groups along the optical axis not being interlocked.

According to the varifocal lens of the present invention, correction for the movement of the image plane along the optical axis accompanying focal length adjustment is made by moving the second lens group independently of the fourth lens group so that an interlocking mechanism between the second and fourth lens groups can be omitted. This contributes to miniaturization and cost reduction, and furthermore it becomes possible to have a high variation in focal lengths and to achieve a high optical performance over the entire range of focal lengths from the visible light region to the near-infrared light region.

Two embodiments of the present invention will now be described with reference to the drawings.

Embodiment 1

FIG. 1 shows a cross-sectional view of Embodiment 1 of the varifocal lens of the present invention at the wide-angle end.

Table 1 below lists the surface number #, in order from the object side, the radius of curvature R (in mm) of each surface near the optical axis, the on-axis surface spacing D (in mm), as well as the refractive index $N_d$ and the Abbe number $v_d$ at the d-line (587.6 nm) of each optical element for Embodiment 1.

TABLE 1

| # | R | D | $N_d$ | $v_d$ |
|---|---|---|---|---|
| 1 | 56.8516 | 1.110 | 1.84666 | 23.8 |
| 2 | 24.8838 | 5.550 | 1.49700 | 81.5 |
|  |  |  |  | ($v_{d12}$) |
| 3 | −63.8774 | 0.100 |  |  |
| 4 | 21.1367 | 3.110 | 1.67003 | 47.2 |
| 5 | 79.9995 | $D_5$ (variable) |  |  |
| 6 | 67.5283 | 0.670 | 1.80400 | 46.6 |
| 7 | 7.3506 | 2.780 |  |  |
| 8 | −9.4119 | 0.650 | 1.80610 | 33.3 |
| 9 | 9.4119 | 2.500 | 1.92286 | 18.9 |
|  |  |  | ($N_{d23}$) |  |
| 10 | −40.0974 | $D_{10}$ (variable) |  |  |
| 11 | 11.3115 | 4.592 | 1.48749 | 70.2 |
| 12 | −11.3115 | 2.287 | 1.83400 | 37.2 |
| 13 | −32.5901 | $D_{13}$ (variable) |  |  |
| 14* | 12.3065 | 4.584 | 1.58913 | 61.1 |
| 15* | −23.5061 | 0.857 |  |  |
| 16 | ∞ | 3.880 | 1.72825 | 28.5 |
| 17 | 7.2979 | 0.200 |  |  |
| 18 | 8.5135 | 3.430 | 1.51633 | 64.1 |
| 19 | −30.5380 | $D_{19}$ (variable) |  |  |
| 20 | ∞ | 4.000 | 1.51680 | 64.2 |
| 21 | ∞ |  |  |  |

The lens surfaces with a * to the right of the surface number in Table 1 are aspheric, and the shape of these aspherical surfaces is defined using Equation (A) above.

In the varifocal lens of Embodiment 1, the second lens group $G_2$ moves during adjustment of the focal length and the fourth lens group $G_4$ moves during compensating focus adjustment. Therefore, the values of the on-axis spacings $D_5$, $D_{10}$, $D_{13}$, and $D_{19}$ between the lens groups change during these adjustments. Table 2 below lists the values of the variables $D_5$, $D_{10}$, $D_{13}$, and $D_{19}$ (i.e, the group spacings), the f-number $F_{NO}$, and the half-field angle ω at the wide-angle end (f=5.23 mm), at an intermediate focal length (f=27.55 mm), and at the telephoto end (f=49.87 mm) for Embodiment 1.

TABLE 2

| f | $D_5$ | $D_{10}$ | $D_{13}$ | $D_{19}$ | $F_{NO}$ | ω |
|---|---|---|---|---|---|---|
| 5.23 | 0.480 | 20.420 | 5.302 | 4.000 | 1.68 | 31° |
| 27.55 | 14.787 | 6.113 | 1.514 | 7.788 | 2.14 | 6° |
| 49.87 | 18.602 | 2.298 | 5.366 | 3.936 | 2.46 | 3° |

Figure 6C:
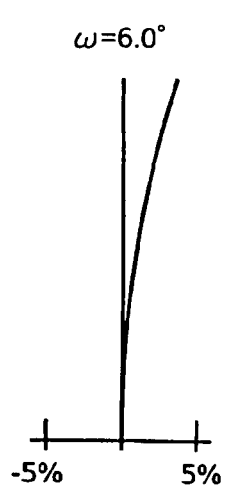
Figure 7A:
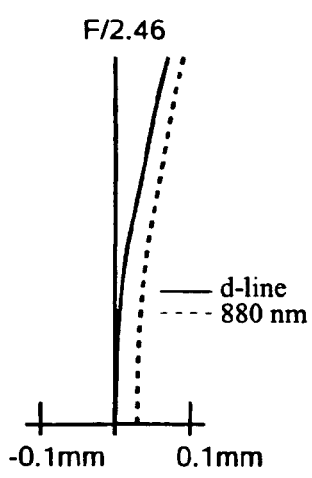
FIGS. 7A–7C show aberrations of Embodiment 1 of the varifocal lens of the present invention at the telephoto end.
Figure 7B:
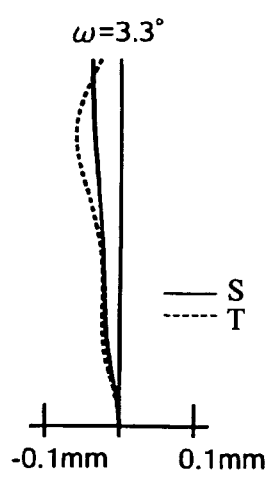
Figure 7C:
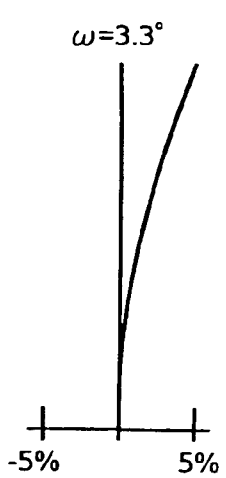

Table 3 below lists the values of the constant K and the aspheric coefficients $A_3$–$A_{10}$ used in Equation (A) above for each of the aspheric surfaces indicated in Table 1. Aspheric coefficients that are not present in Table 3 are zero. An "E" in the data indicates that the number following the "E" is the exponent to the base 10. For example, "1.0E-2" represents the number $1.0 \times 10^{-2}$.

surface S and the tangential image surface T. In FIGS. 5C, 6C, and 7C, distortion is measured at 587.6 nm (the d-line). As is apparent from these figures, the various aberrations are favorably corrected over the entire varifocal range.

Embodiment 2

FIG. 2 shows a cross-sectional view of Embodiment 2 of the varifocal lens of the present invention at the wide-angle end. Embodiment 2 is very similar to Embodiment 1 and therefore only the differences between Embodiment 2 and Embodiment 1 will be explained. As shown in FIG. 2, in Embodiment 2 of the present invention, the tenth lens element $L_{10}$ has a meniscus shape with its convex lens surface on the object side, but as in Embodiment 1, has negative refractive power. Embodiment 2 also differs from Embodiment 1 in its lens element configuration having different radii of curvature of the lens surfaces, different eccentricities and aspheric coefficients of the aspheric lens surfaces, some different optical element surface spacings, some different refractive indexes, and some different Abbe numbers of the materials of the lens elements.

Table 5 below lists the surface number #, in order from the object side, the radius of curvature R (in mm) of each surface near the optical axis, the on-axis surface spacing D (in mm), as well as the refractive index $N_d$ and the Abbe number $v_d$ at the d-line (587.6 nm) of each optical element for Embodiment 2.

TABLE 3

| # | K | $A_3$ | $A_4$ | $A_5$ | $A_6$ | $A_7$ | $A_8$ | $A_9$ | $A_{10}$ |
|---|---|---|---|---|---|---|---|---|---|
| 14 | 4.19523E−1 | −4.67515E−5 | −9.60256E−5 | 7.17586E−6 | −2.78379E−6 | −1.68451E−6 | 8.82390E−7 | −1.53509E−7 | 7.95386E−9 |
| 15 | 9.16076E−1 | −2.33360E−4 | 3.12605E−4 | −6.67354E−5 | 8.84521E−6 | −5.59827E−6 | 2.38151E−6 | −4.26365E−7 | 2.59202E−8 |

Table 4 below lists the values of Conditions (1)–(5) above for Embodiment 1 of the present invention.

TABLE 4

| Condition No. | Condition | Value |
|---|---|---|
| (1) | $v_{d12} > 75$ | 81.5 |
| (2) | $N_{d23} > 1.83$ | 1.92286 |
| (3) | $0.9 < I_a/f_1 < 1.5$ | 1.2 |
| (4) | $1.2 < str/z < 2.5$ | 1.9 |
| (5) | $chro\_880/f_1 < 4.0 \times 10^{-3}$ | $3.1 \times 10^{-3}$ |

As is clear from Table 4, the varifocal lens of Embodiment 1 satisfies all of the Conditions (1)–(5).

Figure 5A:
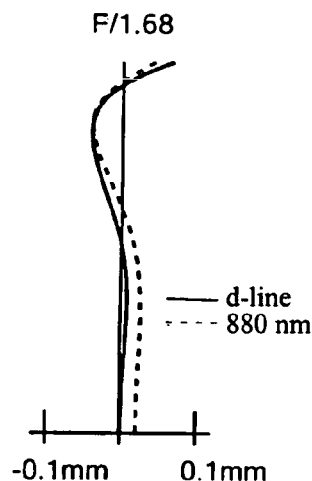
FIGS. 5A–5C show aberrations of Embodiment 1 of the varifocal lens of the present invention at the wide-angle end.
Figure 5B:
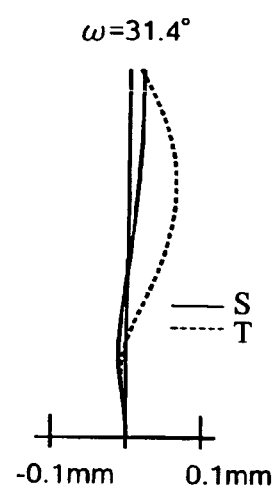
Figure 5C:
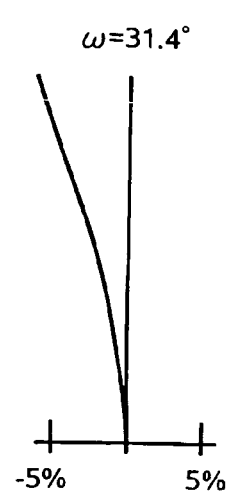
Figure 6A:
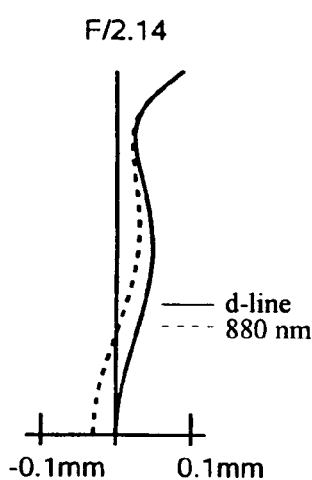
FIGS. 6A–6C show aberrations of Embodiment 1 of the varifocal lens of the present invention at an intermediate position.
Figure 6B:
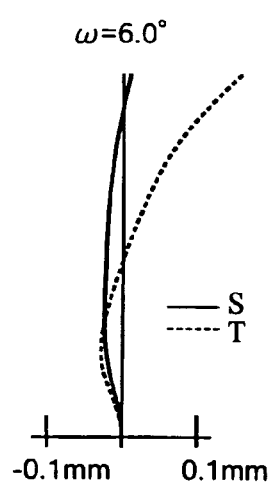

FIGS. 5A–5C show the spherical aberration, astigmatism, and distortion, respectively, of the varifocal lens of Embodiment 1 at the wide-angle end. FIGS. 6A–6C show the spherical aberration, astigmatism, and distortion, respectively, of the varifocal lens of Embodiment 1 at an intermediate position, and FIGS. 7A–7C show the spherical aberration, astigmatism, and distortion, respectively, of the varifocal lens of Embodiment 1 at the telephoto end. In FIGS. 5A, 6A, and 7A, the spherical aberration is shown for the wavelengths 587.6 nm (the d-line) and 880 nm. In the remaining figures, ω is the half-field angle. In FIGS. 5B, 6B, and 7B, the astigmatism is shown for the sagittal image

TABLE 5

| # | R | D | $N_d$ | $v_d$ |
|---|---|---|---|---|
| 1 | 36.9777 | 1.100 | 1.80518 | 25.4 |
| 2 | 21.2506 | 5.690 | 1.49700 | 81.5 |
|   |         |       |         | ($v_{d12}$) |
| 3 | −110.7320 | 0.100 | | |
| 4 | 19.6409 | 3.351 | 1.58913 | 61.1 |
| 5 | 79.9994 | $D_5$ (variable) | | |
| 6 | 46.0587 | 0.650 | 1.80610 | 33.3 |
| 7 | 7.3039 | 2.878 | | |
| 8 | −9.2476 | 0.650 | 1.80400 | 46.6 |
| 9 | 9.9378 | 2.275 | 1.92286 | 18.9 |
|   |         |       | ($N_{d23}$) | |
| 10 | −103.4410 | $D_{10}$ (variable) | | |
| 11 | 14.0740 | 4.701 | 1.62299 | 58.2 |
| 12 | −9.1744 | 0.650 | 1.80610 | 33.3 |
| 13 | −38.8724 | $D_{13}$ (variable) | | |
| 14* | 13.8237 | 3.282 | 1.58913 | 61.1 |
| 15* | −22.4108 | 0.469 | | |
| 16 | 94.0208 | 3.880 | 1.67270 | 32.1 |
| 17 | 6.9808 | 0.200 | | |
| 18 | 7.9905 | 3.430 | 1.48749 | 70.2 |
| 19 | −34.1037 | $D_{19}$ (variable) | | |
| 20 | ∞ | 4.000 | 1.51680 | 64.2 |
| 21 | ∞ | | | |

The lens surfaces with a * to the right of the surface number in Table 5 are aspheric, and the shape of these aspherical surfaces is defined using Equation (A) above.

In the varifocal lens of Embodiment 2, the second lens group $G_2$ moves during adjustment of the focal length and the fourth lens group $G_4$ moves during compensating focus adjustment. Therefore, the values of the on-axis spacings $D_5$, $D_{10}$, $D_{13}$, and $D_{19}$ between the lens groups change during these adjustments. Table 6 below lists the values of the variables $D_5$, $D_{10}$, $D_{13}$, and $D_{19}$ (i.e, the group spacings), the f-number $F_{NO}$, and the half-field angle ω at the wide-angle end (f=5.21 mm), at an intermediate focal length (f=27.40 mm), and at the telephoto end (f=49.60 mm) for Embodiment 2.

TABLE 6

| f | $D_5$ | $D_{10}$ | $D_{13}$ | $D_{19}$ | $F_{NO}$ | ω |
|---|---|---|---|---|---|---|
| 5.21 | 0.480 | 18.501 | 5.220 | 4.000 | 1.63 | 32° |
| 27.40 | 13.140 | 5.841 | 1.509 | 7.713 | 2.08 | 6° |
| 49.60 | 16.534 | 2.446 | 5.292 | 3.930 | 2.37 | 3° |

Table 7 below lists the values of the constant K and the aspherical coefficients $A_3$–$A_{10}$ used in Equation (A) above for each of the aspherical surfaces indicated in Table 5. Aspheric coefficients that are not present in Table 7 are zero. An "E" in the data indicates that the number following the "E" is the exponent to the base 10. For example, "1.0E-2" represents the number $1.0\times10^{-2}$.

TABLE 7

| # | K | $A_3$ | $A_4$ | $A_5$ | $A_6$ | $A_7$ | $A_8$ | $A_9$ | $A_{10}$ |
|---|---|---|---|---|---|---|---|---|---|
| 14 | 4.31366E-1 | -5.20957E-5 | -1.48437E-4 | 2.91878E-6 | -3.03768E-6 | -1.70468E-6 | 8.78426E-7 | -1.54981E-7 | 7.62028E-9 |
| 15 | 2.06695 | -1.92857E-4 | 1.96500E-4 | -5.76613E-5 | 8.13967E-6 | -5.80924E-6 | 2.36637E-6 | -4.24741E-7 | 2.67942E-8 |

Table 8 below lists the values of Conditions (1)–(5) above for Embodiment 2 of the present invention.

TABLE 8

| Condition No. | Condition | Value |
|---|---|---|
| (1) | $v_{d12} > 75$ | 81.5 |
| (2) | $N_{d23} > 1.83$ | 1.92286 |
| (3) | $0.9 < I_a/f_1 < 1.5$ | 1.2 |
| (4) | $1.2 < str/z < 2.5$ | 1.7 |
| (5) | $chro\_880/f_1 < 4.0 \times 10^{-3}$ | $3.8 \times 10^{-3}$ |

As is clear from Table 8, the varifocal lens of Embodiment 2 satisfies all of the Conditions (1)–(5).

Figure 8A:
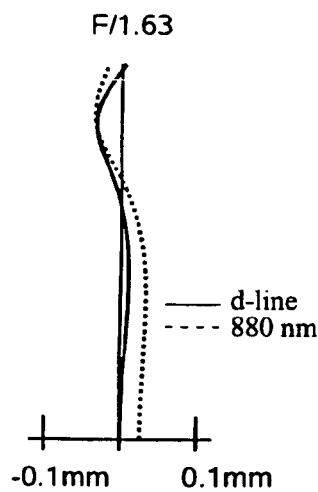
FIGS. 8A–8C show aberrations of Embodiment 2 of the varifocal lens of the present invention at the wide-angle end.
Figure 8B:
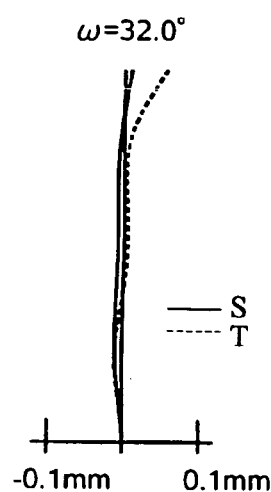
Figure 8C:
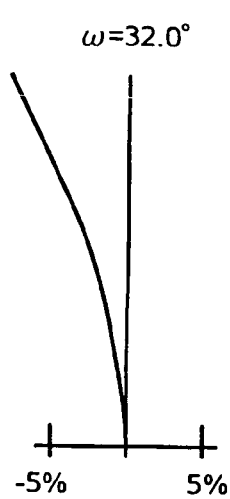
Figure 9A:
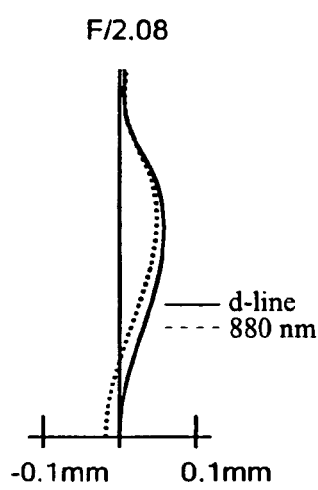
FIGS. 9A–9C show aberrations of Embodiment 2 of the varifocal lens of the present invention at an intermediate position.
Figure 9B:
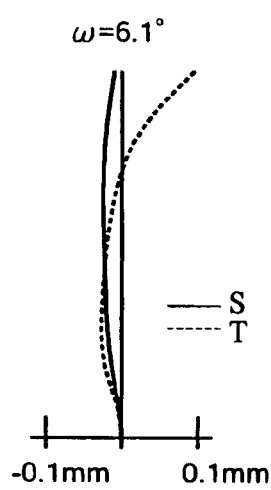
Figure 9C:
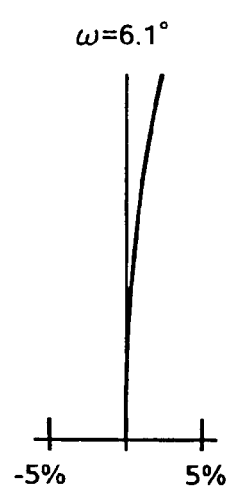
Figure 10A:
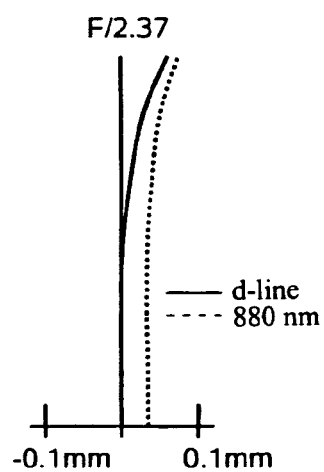
FIGS. 10A–10C show aberrations of Embodiment 2 of the varifocal lens of the present invention at the telephoto end.
Figure 10B:
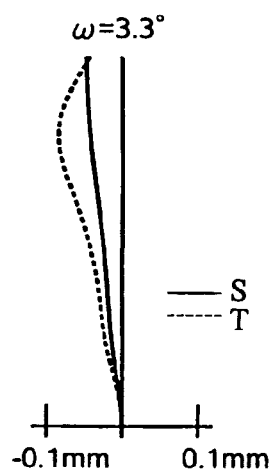
Figure 10C:
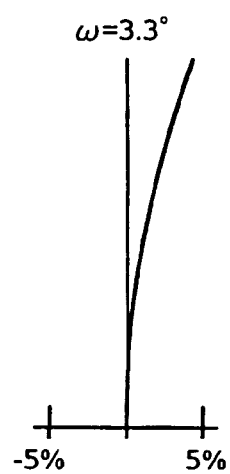

FIGS. 8A–8C show the spherical aberration, astigmatism, and distortion, respectively, of the varifocal lens of Embodiment 2 at the wide-angle end. FIGS. 9A–9C show the spherical aberration, astigmatism, and distortion, respectively, of the varifocal lens of Embodiment 2 at an intermediate position, and FIGS. 10A–10C show the spherical aberration, astigmatism, and distortion, respectively, of the varifocal lens of Embodiment 2 at the telephoto end. In FIGS. 8A, 9A, and 10A, the spherical aberration is shown for the wavelengths 587.6 nm (the d-line) and 880 nm. In the remaining figures, ω is the half-field angle. In FIGS. 8B, 9B, and 10B, the astigmatism is shown for the sagittal image surface S and the tangential image surface T. In FIGS. 8C, 9C, and 10C, distortion is measured at 587.6 nm (the d-line).

As is apparent from these figures, the various aberrations are favorably corrected over the entire varifocal range.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. Additionally, the form and number of lens elements and lens components that constitute various lens groups may be varied. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A varifocal lens comprising four lens groups, arranged along an optical axis in order from the object side, as follows:
    a first lens group having positive refractive power;
    a second lens group having negative refractive power;
    a third lens group having positive refractive power; and
    a fourth lens group having positive refractive power;
    wherein
    the first lens group and the third lens group do not move during varifocal adjustment;
    the second lens group is moved along the optical axis toward the image side during varifocal adjustment from the wide-angle end to the telephoto end; and
    correction of the movement of the image plane due to movement of the second lens group along the optical axis is performed by independently moving the fourth lens group along the optical axis.

2. The varifocal lens of claim 1, wherein the first lens group includes, in order from the object side, a first lens element having negative refractive power, a second lens element having positive refractive power and forming a lens component with the first lens element of the first lens group, and a third lens element having positive refractive power;
    the second lens group includes, in order from the object side, a first lens element having negative refractive power, a second lens element having negative refractive power, and a third lens element having positive refractive power and forming a lens component with the second lens element of the second lens group;
    the third lens group includes, in order from the object side, a first lens element having positive refractive power, and a second lens element having negative refractive power and having a concave lens surface on its object side, and forming a lens component with the first lens element of the third lens group; and
    the fourth lens group includes, in order from the object side, a first lens element having positive refractive power, a second lens element having negative refractive power, and a third lens element having positive refractive power and forming a lens component with the second lens element of the fourth lens group, and at least one lens surface of at least one lens element of the fourth lens group is aspheric.

3. The varifocal lens of claim 1, wherein the following conditions are satisfied:

$$\nu_{d12} > 75$$

$$N_{d23} > 1.83$$

where
$\nu_{d12}$ is the Abbe number of the second lens element of the first lens group at the d-line, and
$N_{d23}$ is the refractive index of the third lens element of the second lens group at the d-line.

4. The varifocal lens of claim 2, wherein the following conditions are satisfied:

$$\nu_{d12} > 75$$

$$N_{d23} > 1.83$$

where
$\nu_{d12}$ is the Abbe number of the second lens element of the first lens group at the d-line, and
$N_{d23}$ is the refractive index of the third lens element of the second lens group at the d-line.

5. The varifocal lens of claim 1, wherein the following conditions are satisfied:

$$0.9 < I_a/f_1 < 1.5$$

$$1.2 < str/z < 2.5$$

$$chro\_880/f_1 < 4.0 \times 10^{-3}$$

where
$I_a$ is the distance along the optical axis from the object-side lens surface of the object-side lens element of the first lens group of the varifocal lens to the object-side lens surface of the object-side lens element of the third lens group of the varifocal lens;
$f_1$ is the composite focal length of the first lens group;
str is the distance along the optical axis that the second lens group moves during varifocal adjustment of the varifocal lens;
z is the ratio of the focal length of the varifocal lens at the telephoto end divided by the focal length of the varifocal lens at the wide-angle end, associated with movement of the second lens group over the distance str; and
chro_880 is the chromatic aberration on the optical axis for a wavelength of 880 nm relative to the d-line for the first lens group.

6. The varifocal lens of claim 2, wherein the following conditions are satisfied:

$$0.9 < I_a/f_1 < 1.5$$

$$1.2 < str/z < 2.5$$

$$chro\_880/f_1 < 4.0 \times 10^{-3}$$

where
$I_a$ is the distance along the optical axis from the object-side lens surface of the object-side lens element of the first lens group of the varifocal lens to the object-side lens surface of the object-side lens element of the third lens group of the varifocal lens;
$f_1$ is the composite focal length of the first lens group;
str is the distance along the optical axis that the second lens group moves during varifocal adjustment of the varifocal lens;
z is the ratio of the focal length of the varifocal lens at the telephoto end divided by the focal length of the varifocal lens at the wide-angle end, associated with movement of the second lens group over the distance str; and
chro_880 is the chromatic aberration on the optical axis for a wavelength of 880 nm relative to the d-line for the first lens group.

7. The varifocal lens of claim 3, wherein the following conditions are satisfied:

$$0.9 < I_a/f_1 < 1.5$$

$$1.2 < str/z < 2.5$$

$$chro\_880/f_1 < 4.0 \times 10^{-3}$$

where
$I_a$ is the distance along the optical axis from the object-side lens surface of the object-side lens element of the first lens group of the varifocal lens to the object-side lens surface of the object-side lens element of the third lens group of the varifocal lens;
$f_1$ is the composite focal length of the first lens group;
str is the distance along the optical axis that the second lens group moves during varifocal adjustment of the varifocal lens;
z is the ratio of the focal length of the varifocal lens at the telephoto end divided by the focal length of the varifocal lens at the wide-angle end, associated with movement of the second lens group over the distance str; and
chro_880 is the chromatic aberration on the optical axis for a wavelength of 880 nm relative to the d-line for the first lens group.

8. The varifocal lens of claim 4, wherein the following conditions are satisfied:

$$0.9 < I_a/f_1 < 1.5$$

$$1.2 < str/z < 2.5$$

$$chro\_880/f_1 < 4.0 \times 10^{-3}$$

where
$I_1$ is the distance along the optical axis from the object-side lens surface of the object-side lens element of the first lens group of the varifocal lens to the object-side lens surface of the object-side lens element of the third lens group of the varifocal lens;
$f_1$ is the composite focal length of the first lens group;
str is the distance along the optical axis that the second lens group moves during varifocal adjustment of the varifocal lens;
z is the ratio of the focal length of the varifocal lens at the telephoto end divided by the focal length of the varifocal lens at the wide-angle end, associated with movement of the second lens group over the distance str; and
chro_880 is the chromatic aberration on the optical axis for a wavelength of 880 nm relative to the d-line for the first lens group.

9. The varifocal lens of claim 1, wherein the varifocal lens is formed of only four lens groups.

10. The varifocal lens of claim 9, wherein the varifocal lens is formed of only eleven lens elements.

11. The varifocal lens of claim 2, wherein the varifocal lens is formed of only four lens groups.

12. The varifocal lens of claim 3, wherein the varifocal lens is formed of only four lens groups.

13. The varifocal lens of claim 4, wherein the varifocal lens is formed of only four lens groups.

14. The varifocal lens of claim 5, wherein the varifocal lens is formed of only four lens groups.

15. The varifocal lens of claim 6, wherein the varifocal lens is formed of only four lens groups.

16. The varifocal lens of claim 7, wherein the varifocal lens is formed of only four lens groups.

17. The varifocal lens of claim 8, wherein the varifocal lens is formed of only four lens groups.

18. The varifocal lens of claim 17, wherein the varifocal lens is formed of only eleven lens elements.

* * * * *